(12) United States Patent
Cain et al.

(10) Patent No.: US 6,340,491 B1
(45) Date of Patent: *Jan. 22, 2002

(54) FREE FLOWING FAT COMPOSITIONS

(75) Inventors: Frederick William Cain; Willem Dekker, both of Wormerveer (NL); Stephen Raymond Moore, Sharnbrook (GB)

(73) Assignee: Loders Croklaan B.V., Wormerveer (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/705,865

(22) Filed: Nov. 6, 2000

Related U.S. Application Data

(63) Continuation of application No. 09/155,991, filed as application No. PCT/EP97/00829 on Feb. 19, 1997, now Pat. No. 6,165,518.

(30) Foreign Application Priority Data

Apr. 11, 1996 (EP) .............................................. 96302539

(51) Int. Cl.⁷ ................................................. A23D 9/00
(52) U.S. Cl. ........................ 426/554; 426/588; 426/595; 426/607
(58) Field of Search ............................ 426/601, 33, 55, 426/417, 554, 588, 595, 607

(56) References Cited

U.S. PATENT DOCUMENTS

| | | | |
|---|---|---|---|
| 4,242,364 A | 12/1980 | Buddemeyer | 426/98 |
| 4,375,483 A | 3/1983 | Shuford | 426/330.6 |
| 4,826,693 A | 5/1989 | Smith | 426/34 |
| 4,952,224 A | 8/1990 | Lelakos | 62/534 |
| 4,973,430 A * | 11/1990 | Rivers | 260/409 |
| 5,084,294 A | 1/1992 | Schroeder | 426/545 |
| 5,370,892 A | 12/1994 | El-Nokaly | 426/531 |
| 5,549,917 A * | 8/1996 | Cherukuri | 426/96 |
| 5,756,143 A | 5/1998 | Cain | 426/607 |
| 5,855,944 A | 1/1999 | Koschenski | 426/541 |
| 6,020,020 A * | 2/2000 | Cain | 426/601 |
| 6,030,645 A | 2/2000 | Tretsch | 424/490 |
| 6,165,518 A * | 12/2000 | Cain | 426/74 |

FOREIGN PATENT DOCUMENTS

| | | |
|---|---|---|
| EP | 0601965 | 6/1994 |
| EP | 0643916 | 3/1995 |
| EP | 0739589 | 10/1996 |
| GB | 1164462 | 9/1969 |
| GB | 0425213 | 5/1991 |
| WO | WO 94/24889 | 11/1994 |

OTHER PUBLICATIONS

Hui, 1996. Bailey's Industrial Oil and Fat Products, 5th edition, vol. 2 John Wiley & Sons, Inc., New York, pp. 540–547, 565.*
ADM Food Ingredient Catalog. 1997–1998. pp. 28–31.*

* cited by examiner

Primary Examiner—Carolyn Paden
(74) Attorney, Agent, or Firm—Pillsbury Winthrop LLP

(57) ABSTRACT

Free flowing fat compositions with high levels of triglycerides, containing long chain poly unsaturated fatty acids comprise: (1) a blend of fats (A) and (B) in a weight ration 90:10 to 10:90; (2) 0–95 wt. % of a filler material, wherein fat A is a fat with $\geq 0.5$ wt. % of LC PUFA'S and fat B is a hard fat, while the composition fulfills the requirement that: [$N_{30}$(unstab) of fat (A) or the blend +% of filler in composition]$\geq 70$.

15 Claims, No Drawings

FREE FLOWING FAT COMPOSITIONS

This is a continuation of application Ser. No. 09/155,991, filed May 13, 1999, now U.S. Pat. No. 6,165,518, which is a 371 PCT/EP97/00829, filed Feb. 19, 1997.

FIELD OF THE INVENTION

Free flowing fat compositions are commercially available. In some of these commercially available compositions 10–20 wt % of a natural fish oil is present. In order to make these compositions free flowing a support material, such as a starch or a sugar must be present as well and even then these compositions could not contain more than 25 wt % of the fish oil(s). Therefore, these compositions had a limited use, as they do provide on the one hand the advantages of being free flowing, they also had the disadvantage that only a limited amount of fish oil could be added by using them in e.g. food products. Therefore, there existed a great demand for free flowing fat compositions with which also higher dosages of polyunsaturated triglycerides, such as fish oil or conjugated linoleic acids (=CLA's) could be added upon its use.

DESCRIPTION OF RELATED ART

According to WO 94/00146 marine oils are blended with solid fats in such a way that the marine oils become part of the crystalline structure of the solid fat. This blend is applied in liquid state to porous pellets of undefined nature, followed by cooling and crystallisation of the fat. Examples of the solid fat are tempered rapeseed oil, monoglycerides, diglycerides or mixes thereof. The product is applied as fodder for aquatic organisms.

From JP 07/133491 it is known to prepare oil soluble substances containing solid materials by adding a liquid oil soluble substance to silica gel and solidifying it. The liquid oil soluble substance includes poly unsaturated fatty acid compounds. The compositions according to this disclosure have the disadvantage that relatively high amounts of an inorganic filler material (=silica gel) have to be present in the compositions, which makes them less useful in food compositions. Moreover we found that the amount of fish oil that could be incorporated in compositions that were free flowing was rather limited. In JP 03/269096 it is disclosed that fluid compositions that contain oils such as fish oil or hardenend fish oil can be obtained if they are blended with 20–70 wt % of flour, in particular soybean flour. So again these products require the presence of a filler material. The presence of such a filler is not always appreciated in food products. In that instance this document does not reveal a solution for compositions that are free flowing, contain relatively high amounts of fish oil but that do not contain a filler material. Also in EP 425 213 free flowing compositions are disclosed that require the presence of filler materials such as starch or caseinate.

SUMMARY OF THE INVENTION

We found that the presence of a hard fat in our compositions provided us with compositions that contain high amounts of poly unsaturated fats, are still free flowing and do not require the presence of a filler. It should be understood that a filler material can be present as well, however the hard fat should also be present in that instance.

Therefore we found that by applying a hard fat in combination with the long chain polyunsaturated triglycerides, with or without a filler (or support) material, compositions could be obtained that were free flowing and which would enable us to add higher dosages (ie at least 10 wt %) of long chain polyunsaturated triglycerides.

Therefore, our invention concerns a free flowing fat composition comprising:
  (i) a blend of fats (A) and (B) in a weight ratio of 90:10 to 10:90
  (ii) 0–95 wt % of a filler material wherein fat A is a fat with at least 0.5 wt % of long chain polyunsaturated fatty acids, preferably being w-3 fatty acids or conjugated linoleic acids and fat B is a hard fat, so that [$N_{30}$ (unstab) of the fat (A) or the blend +% filler in composition] is at least 70, preferably at least 75, in particular 80–160.

DETAILED DESCRIPTION OF THE INVENTION

Above compositions have a number of benefits over known compositions:
  (1) using above composition can avoid the introduction of non lipid materials in the systems, wherein they are applied.
  (2) higher concentrations of long chain PUFA materials can be achieved in free flowing products.
  (3) the products display excellent dispersibility in cold water.
  (4) the products have a particle size distribution which makes them most suitable for use in e.g. infant formula.

In order to be able to add higher amounts of the long chain polyunsaturated fatty acids, we prefer to use a fat A, that contains more than 2 wt %, preferably 4–50 wt % and most preferably 5–20 wt % of these LCPUFA's.

Suitably a fat blend is used that displays an $N_{30}$>25, preferably>35 more preferably 40–80, and in particular 45–75.

It is mentioned here that N-values refer to solid fat contents, measured by NMR pulse techniques on unstabilized fats. Unstabilized meaning that the fat was melted at 80° C., kept at 60° C. for 5 minutes, cooled to 0° C. and kept at 0° C. for 1 hour and kept at measurement temperature for 30 minutes.

Although in the absence of a filler free flowing compositions could be made, containing 10–25 wt % of the fat, comprising the long chain polyunsaturated triglycerides, it was also found that the level of these latter (soft) fats could be increased to about 35 wt % if a filler was present in the composition. The amount of filler material could vary from 2.5–90 wt %, preferably 10–80 wt %, most preferably 15–70 wt %.

Suitable filler materials are selected from the group, consisting of: sugars, such as glucose, fructose or sucrose, flour, cocoa powder, coffee powder, coffee granules, whey powder, skim milk powder, butter milk powder, food grade inorganic solid powders, such as silica, alumina, titania and zirconia.

The ratio, wherein fats A and B can be applied can range from 10–90 wt %, most preferably 20–80 wt % for fat A to 90–10 wt %, most preferably 80–20 wt % for fat B.

The hard fat can be selected from a wide range of hard fats, such as hardened oils or stearin fractions of vegetable fats. Application of fats B with a melting point of more than 35° C., preferably more than 45° C., in particular more 50–80° C. however lead to the best results.

Examples of such hard fats B are triglycerides, diglycerides, monoglyceride or a mixture thereof, in particular selected from palm oil stearin, hardened soybean oil mpt 65° C., hardened sunflower oil mpt 65° C., distearin, monostearin, monopalmitin.

Our free flowing fats are characterized by a particle size distribution (by sieving) of 5–500 μm, preferably 10–250 μm, most preferably 20–200 μm. Bigger particle than 500 μm mean that lumps are present, that give problems during dispersion of the composition upon its use.

Examples of fats that can be applied as fats A are fats that comprise at least two different long chain PUFA's $L_1$ and $L_2$, in particular being present in a ratio of $L_1:L_2>2$, preferably >3. Examples of such fats are disclosed in our copending applications EP 95302942.8, EP 95302843.6, EP 95302944.4 and EP 95308228.6.

Particular examples of such fats A are derived from natural fish oil, modified fish oil, fish oil concentrate, fractionated fish oil, enzymically treated fish oil or oils from microbial sources. Other examples of fats A are triglycerides, containing conjugated linoleic acids. Examples of sources for CLA's can be found in: U.S. Pat. No. 5.430.066, U.S. Pat. No. 5.428.072, U.S. Pat. No. 5.070.104, U.S. Pat. 5.017.614, U.S. Pat. No. 5.208.356, or EP 411.011.

Fats can be made from these CLA's by enzymic or chemical conversions thereof. From above fats we prefer to use these fats, wherein two different LCPUFA's are present in a ratio of at least 2, preferably at least 3.

Part of our invention are also food products, comprising at least a fat, wherein the fat is present in the form of the free flowing composition of the invention.

Examples of these food products are: bread; bakery goods; such as cakes, pastries or, croissants; infant formula; creamers; coffee whiteners.

The free flowing composition can be made by blending of fats A and B, after which the blend is cryomilled, spray-crystallized or spray-dried. Cryomilling in the presence of solid $CO_2$ or liquid $N_2$ being the most preferred routes. Cryomilling being performed in a mill in the presence of a low temperature agent, such as solid $CO_2$. As a mill any known type of mill can be used, suitable for use at low temperature.

EXAMPLES

I. Using a Fish Oil

As fish oil a semi-refined tuna oil was applied, containing 30.9 wt % of polyunsaturated fatty acid moieties (mainly DHA and EPA). As hard fat hardened soybean oil mpt 65° C. was applied. As filler material either sugar or flour was used. The free flowing character of the product was evaluated by a panel. It was expressed by a number varying from 1–5 (1=bad, 5=very good).

The fish oil or the blend of fish oil and hard fat were mixed with about equal weight amounts of solid $CO_2$ and milled in a turmix-blender for 1–5 min.

Thereafter, if appropriate a filler material was added in the amounts indicated in the table.

II. Using Conjugated Linoleic Acid (=CLA)

Example I was repeated. However CLA was applied in stead of fish oil. The composition used comprised 31 wt % free CLA; 13 wt % hardened bean oil 65 and 65 wt % sugar. The mixture obtained scored a free flowing of 4.

TABLE

| $N_{30}$ (blend) | % FH in blend | level of filler | free flowing character |
|---|---|---|---|
| 42 | 60 | — | not cryomillable * |

TABLE-continued

| $N_{30}$ (blend) | % FH in blend | level of filler | free flowing character |
|---|---|---|---|
| 52 | 50 | — | ibid * |
| 63 | 40 | 0 | 1 * |
| 72 | 30 | 0 | 4 |
| 81 | 20 | 0 | 5 |
| 72 | 30 | 50% sugar | 5 |
| 52 | 50 | 50% sugar | 5 |
| 32 | 70 | 50% sugar | 3 |
| 35 | 67 | 25% sugar | 2 * |
| 72 | 71 | 30% sugar | 4 |
| 72 | 30 | 50 wt % flour | 5 |
| 52 | 50 | 50 wt % flour | 5 |
| 32 | 70 | 50 wt % flour | 3 |
| 35 | 67 | 25 wt % flour | 1 * |
| 0 | 100 | 65 wt % sugar | 2 * |
| 0 | 100 | 50 wt % sugar | 1 * |

* = Not according the invention

We claim:

1. Free flowing fat composition comprising:
   (i) a fat blend of fats (A) and (B) in a weight ratio of 90:10 to 10:90 and
   (ii) 2.5–90 wt % of a filler material wherein fat A is a fat with at least 0.5 wt % of long chain polyunsaturated fatty acids and fat B is a hard fat, so that $N_{30}$ (unstab) of the blend +% filler in composition is at least 70.

2. Free flowing composition according to claim 1, wherein the content of long chain polyunsaturated fatty acids in fat A is more than 2 wt % particular 5–20 wt %.

3. Free flowing composition, according to claim 1, wherein the fat blend (A)+(B) displays an $N_{30}>25$.

4. Free flowing composition, according to claim 1 wherein the content of filler material is 10–80 wt %.

5. Free flowing composition, according to claim 1, wherein the filler material is at least one component, selected from the group consisting of: sugars, flour, cocoa powder, coffee powder, coffee granules, whey powder, skim milk powder, butter milk powder, food grade inorganic solid powders.

6. Free flowing composition according to claim 5, wherein the fat blend comprises 20–80 wt % of fat A, containing the long chain polyunsaturated fatty acids and 80–20 wt % of the hard fat B.

7. Free flowing composition according to claim 6, wherein hard fat B has a melting point of more than 35° C.

8. Free flowing composition according to claim 6, wherein fat A is derived from fish oil, modified fish oil, fish oil concentrate, fractionated fish oil, enzymically treated fish oil or oils from microbial sources.

9. Free flowing composition according to claim 8, wherein fat A comprises at least two different long chain polyunsaturated fatty acids $L_1$ and $L_2$, which are present in a ratio $L_1:L_2>2$.

10. Free flowing composition according to claim 1, wherein hard fat B is a triglyceride, diglyceride, monoglyceride or a mixture thereof.

11. Free flowing composition according to claim 1, wherein the composition has a particle size distribution (by sieving) of 20–200 μm.

12. Food product, comprising at least a fat, wherein the fat is present in the form of the free flowing composition according to claim 1.

13. Food product according to claim 12, wherein the food product is selected from the group, consisting of:

bread; bakery goods; infant formula; creamers; and coffee whiteners.

14. Free flowing composition according to claim 1 wherein the polyunsaturated fatty acid is a w-3 fatty acid or a conjugated linoleic acid.

15. A process for the preparation of a free flowing composition comprising:

(i) a fat blend of fats (A) and (B) in a weight ratio of 90:10 to 10:90 and (ii) 2.5–90 wt % of a filler material wherein fat A is a fat with at least 0.5 wt % of long chain polyunsaturated fatty acids and fat B is a hard fat, so that $N_{30}$ (unstab) of the blend +% filler in composition is at least 70, said process comprising preparing the blend of fats A and B and cryomilling, spray crystallizing or spray-drying said blend.

* * * * *